Nov. 26, 1940.  A. RONNING  2,222,857
MOUNTING FOR VEHICLE WHEELS
Filed Sept. 30, 1939
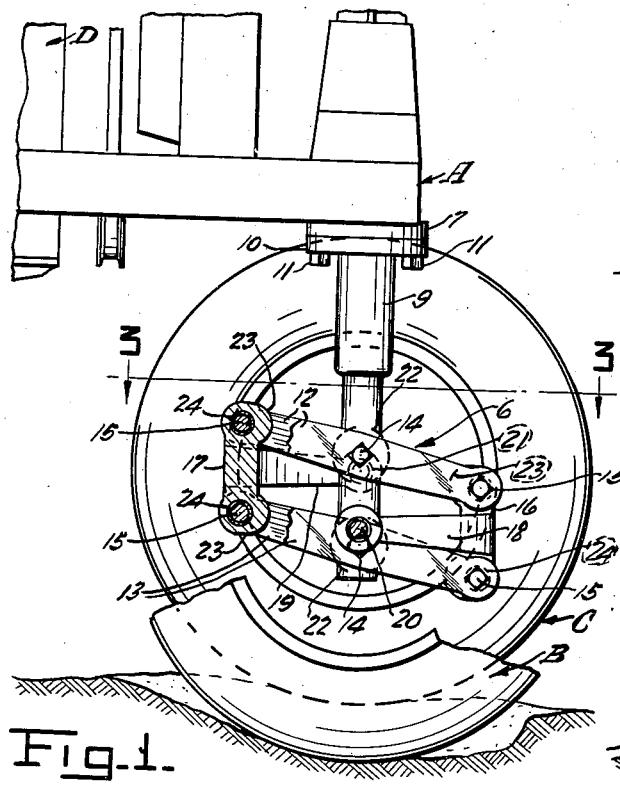
Fig.1.
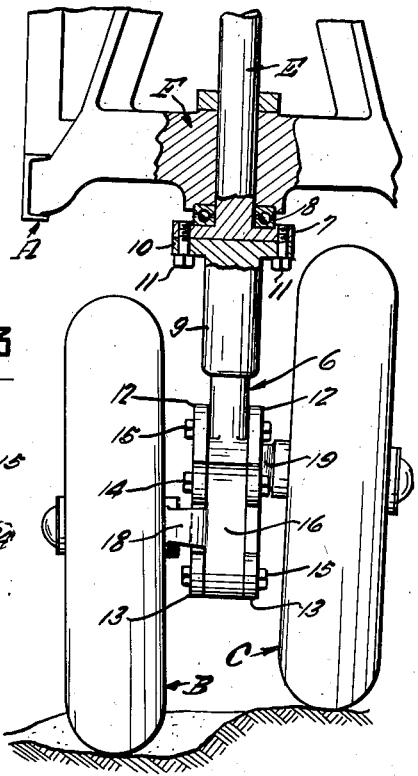
Fig.2.
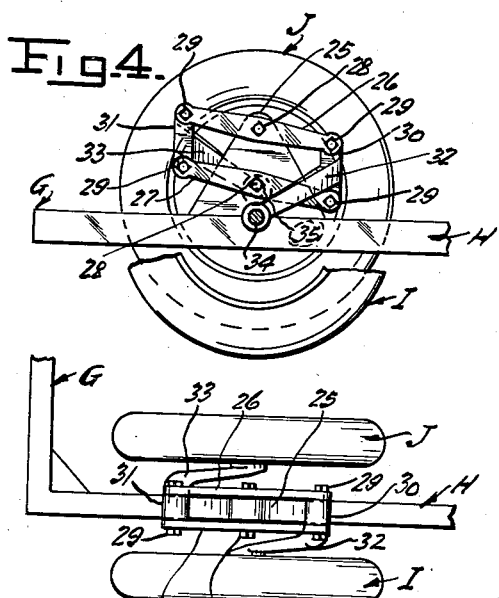
Fig.4.
Fig.5.
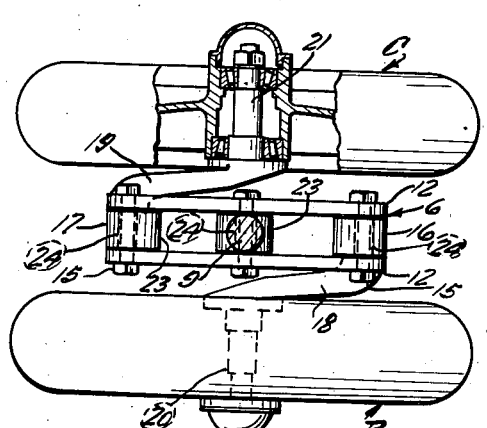
Fig.3.
Inventor
ADOLPH RONNING
By Carlsen & Hazle
Attorneys Patented Nov. 26, 1940

2,222,857

UNITED STATES PATENT OFFICE 2,222,857

MOUNTING FOR VEHICLE WHEELS

Adolph Ronning, Minneapolis, Minn.

Application September 30, 1939, Serial No. 297,292

16 Claims. (Cl. 280—87)

This invention relates to improvements in mounting structures for the supporting wheels of vehicles.

The structure herein provided finds application particularly to the front wheels of tractors of the row crop type. These wheels have heretofore been mounted in close transverse spacing upon rigid laterally extending spindles carried at the lower end of the upright steering post, and as a result when either wheel has met a rise of ground severe transverse stress has been placed on the structure, and there has been a tendency to elevate the forward end of the tractor. The primary object of this invention is to provide mounting means for such wheels by means of which these wheels may be allowed freedom of differential movements in vertical planes to thereby compensate for inequalities in the ground surface and eliminate the disadvantages above noted.

Another object is to provide a differential wheel mounting structure of this kind which may be applied also to other vehicles and particularly to such vehicles as trailers wherein two or more closely spaced wheels are used in sets at each side in order to better distribute the load to the road.

A further object of the invention is to provide a structure of this kind in which the parts are so arranged and compacted that the wheels may be mounted very closely together to thus facilitate steering operation and use between crop rows.

Fig. 1 is a side elevation of the lower forward portion of a tractor in which the front wheels are supported by my mounting device, the near wheel being almost entirely removed and shown as running at a lower level than the far wheel, and a rear portion of the mounting being shown in vertical section.

Fig. 2 is a front elevation of the structure shown in Fig. 1, and with an upper portion shown in cross section.

Fig. 3 is a horizontal cross section along the line 3—3 in Fig. 1, a medial portion of one wheel being shown in diametrical section.

Fig. 4 is a side elevation, reduced in scale, of a portion of a vehicle or trailer frame showing a modified form of mounting for such wheels and with the near wheel broken away and running at a lower elevation similar to the condition shown in Fig. 1.

Fig. 5 is a plan view of the structure shown in Fig. 4.

It may here be noted that the present invention is somewhat similar in function and purpose to the structures disclosed in several of my copending applications including Serial Nos. 242,725; 242,726; 244,019; and 250,345 (now Patents Nos. 2,208,599; 2,208,600; 2,208,601 and 2,209,095, respectively, of July 23, 1940; 219,369; 310,941; 310,943 and 311,330.

Referring now more particularly to the drawing and to Figs. 1–3 thereof, my invention is first shown as applied to a conventional tractor A of the row crop type which has the two front wheels B and C closely spaced in order to run between adjacent crop rows. The usual power unit D and rear traction wheels (not shown) are of course provided. The wheels B and C are steered by an upright steering post or member E which is moved about a vertical axis by the usual steering wheel (not shown), and this member E is journaled in a housing F rigidly supported in the tractor frame.

The foregoing structure is substantially conventional and in the usual case the wheels B and C are rigidly supported in such manner that when either meets a rise of ground, or conversely drops into a hollow, there is set up a transverse strain on the parts and the equilibrium of the tractor is considerably upset. In accordance with my invention, however, the wheels B and C are mounted by a movable differential acting assembly, designated generally at 6, and which will now be described in detail.

The steerable member E terminates just beneath the housing F in an enlarged flanged lower end 7 which is braced upwardly against a thrust bearing 8 received between the flange and the housing F. A lower wheel mounting member 9 has a complementary flanged upper end 10 which is secured upwardly against said end 7 by the screws 11 to rigidly, but detachably, connect the parts. Said mounting member thus may depend down between the wheels B and C and will be oscillated about a vertical axis by steering manipulation in the usual way.

Upper and lower, vertically spaced levers or lever members 12 and 13 are fulcrumed intermediate their ends on vertically spaced horizontal axes 14 to the lower end portion of the mounting member 9, there being two upper and two lower levers arranged in parallelism on opposite sides of the member 9, as shown. In the normal position of the parts for straight ahead travel, these levers extend in longitudinal directions substantially parallel with the line of travel, and oscillate upon transverse axes as will be readily evident. At their respective front and rear ends the levers 12 and 13 are pivotally connected at 15 to front and rear carrier or connecting members or links 16 and 17, and these members 16 and 17 carry the oppositely turned wheel mounting arms 18 and 19. The arms 18 and 19 are extended from opposite sides of the front and rear members 16 and 17 between the ends of the levers 12 and 13 and extend respectively rearwardly and forwardly to terminate at their free ends substantially in transverse alignment with the center of the mounting member 9. At these aligned free ends the arms 18 and 19 are provided with the outwardly turned wheel spindles 20 and 21 upon which the hubs of the wheels B and C are journaled as shown.

The entire structure is as shown made sufficiently rugged to stand the strains involved, and for this purpose the areas on the member 9 around the axes 14 are enlarged and flattened as at 22 to give bearing for the levers 12 and 13 while, for the same reason, the ends of the members 16 and 17 are enlarged as at 23 where they fit between the levers. The various pivot axes 14 and 15 are formed by cross bolts as shown and to avoid binding at these points, while still allowing the bolts to be drawn up tight, sleeves 24 are placed around the bolts through the members 9, 16, and 17, so that the levers may be pulled tight against these sleeves.

In operation, as either wheel B or C meets with a rise in ground, it will have a tendency to rise and the end of the parallel lever system formed by the levers 12 and 13 and members 16 and 17, to which the wheel is connected, will also rise. At the same time the opposite end will descend a corresponding amount and there is thus set up a differential compensating action by which both wheels will maintain constant ground contact without disturbing the equilibrium of the tractor itself. It will be evident that the load will at all times be equally distributed to the wheels without setting up angular stresses on the steering post and assembly, and this action will of course take place no matter at what angle the wheels are steered, since the entire assembly moves or steers as a unit.

Attention is called to the fact that, due to the extension of the levers 12 and 13 in parallel fore and aft planes between the wheels, the entire mechanism may be and is very compact laterally or transversely. The wheels may thus be mounted much closer together, without sacrificing lever length and ruggedness, than would be the case were the levers extended crosswise or at right angles to the line of travel. It is, of course, advantageous to keep the wheels B and C close together as possible in order to pass between crop rows, but it is also desirable to use supporting levers of sufficient length to permit a "long stroke" or wide range of vertical movement in the differential as compensating action, and this my invention accomplishes in very satisfactory manner.

The same wheel mounting also finds ready application to other types of vehicles such as in trailers or the like, where it is customary or desirable to provide wheels in pairs at opposite sides in order to better distribute the load. Such an installation is shown in Figs. 4 and 5, wherein a section of the vehicle frame is designated generally at G and includes the longitudinally extending side beam H. A mounting member 25, in this case in the form of a large upstanding lug or ear, is provided atop the beam H and upper and lower pairs of lever members or levers 26 and 27 are fulcrumed to this member upon transverse, vertically spaced, horizontal, axes 28. The levers thus extend forwardly and rearwardly and at their respective front and rear ends are pivotally connected at 29 to connecting members or links 30 and 31. Arms or wheel mounting members 32 and 33 extend respectively rearwardly and forwardly from the front and rear links 30 and 31 at opposite sides and at their free ends carry laterally extended spindles 34 and 35 upon which the wheels I and J are journaled.

The operation of this embodiment of my invention is exactly the same as that previously described and it will be evident that the wheels I and J may play freely up and down on opposite sides of the beam H to thereby maintain constant road contact and equal weight distribution under all circumstances. Such action will, furthermore, reduce to a minimum vertical displacement of the vehicle as it travels over irregularities in the road surface.

The arms 32 and 33 are inclined downwardly toward their free ends, as clearly shown in Fig. 4, in order to lower the wheels with respect to the vehicle frame while providing adequate clearance below the wheel mounting mechanism.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a vehicle, a wheel mounting member, lever members fulcrumed on said mounting member for oscillating movement in vertical planes substantially parallel to the line of travel of the vehicle, a pair of transversely spaced, axially aligned ground wheels and means carried by the wheels for respectively supporting longitudinally opposite ends of the said lever members.

2. In a vehicle, a mounting member on the vehicle, a pair of vertically spaced lever members fulcrumed on the mounting member for oscillating movement at their ends about axes disposed substantially transversely to the line of travel of the vehicle, a pair of axially aligned ground wheels arranged one at each side of the mounting member, and means supportably connecting the wheels to respective opposite ends of the levers.

3. In a vehicle, a mounting member on the vehicle, a pair of vertically spaced levers fulcrumed on the mounting member for oscillating movement in a plane substantially parallel to the line of travel of the vehicle, and laterally arranged, axially aligned ground wheels disposed at opposite sides of the mounting member, links operatively supporting opposite ends of the levers, and support connections between the links and respective wheels.

4. In a vehicle, a wheel mounting member on the vehicle, a pair of vertically spaced levers fulcrumed on the mounting member and extending at their ends forwardly and rearwardly therefrom for oscillating movement in a vertical plane, a pair of ground wheels, means connecting the wheels to respective front and rear ends of the levers, said wheels being disposed in substantial axial alignment with each other and in a transverse vertical plane through the mounting member.

5. In a vehicle, a wheel mounting member on the vehicle, a pair of vertically spaced levers fulcrumed with respect to the wheel mounting member for oscillating movement in a vertical, longitudinally extending plane, ground wheels for supporting front and rear ends of the levers, and connecting means extending alongside the levers between their ends and the said ground wheels to thereby dispose said wheels in substantially transverse alignment at opposite sides of the wheel mounting member.

6. In a vehicle, a wheel mounting member thereon, a pair of vertically spaced levers fulcrumed on transverse axes on said wheel mounting member and extending forwardly and rearwardly at their ends from said member, arms connected to the front and rear ends of the levers and extending respectively rearwardly and forwardly to terminate at their ends substantially in transverse alignment with, and at opposite sides of, the wheel mounting member, and laterally arranged ground wheels connected to the ends of the arms and supporting the levers.

7. In a vehicle, a wheel mounting member thereon, a pair of vertically spaced levers fulcrumed on transverse axes on said wheel mounting member and extending forwardly and rearwardly at their ends from said member, an arm connected to the front ends of the levers and extended rearwardly therefrom, an arm connected to the rear ends of the levers and extended forwardly therefrom, the said arms being disposed alongside the levers and terminating at their ends substantially in transverse alignment with the wheel mounting member, and ground wheels connected to the ends of the arms to thereby support the ends of the levers.

8. In a vehicle, a wheel mounting member thereon, a pair of vertically spaced levers fulcrumed on transverse axes on said wheel mounting member and extending forwardly and rearwardly at their ends from said member, reversely turned arms connected to the ends of the levers and extending laterally with respect to the levers to bring their ends substantially into alignment with a vertical transverse plane through the fulcrums of the levers, and ground wheels connected to the ends of the arms for supporting the ends of the levers.

9. In a vehicle, a wheel mounting member on the vehicle, a pair of vertically spaced levers fulcrumed medially on the mounting member and extending at their ends forwardly and rearwardly therefrom, link members pivotally connecting the corresponding front and rear ends of the levers, arms extended from the link members in oppositely turned relation adjacent the levers, and ground wheels connected to the arms for supporting the ends of the levers.

10. In a vehicle, a wheel mounting member on the vehicle, a pair of vertically spaced levers fulcrumed intermediate their ends on transverse horizontal axes on the wheel mounting member, links pivotally connecting the respective ends of the upper and lower levers for oscillating movement in a vertical plane extending substantially parallel with the line of travel of the vehicle, an arm rigidly connected to each link and turned respectively forwardly and rearwardly from the rear and forward ends of the levers, and ground wheels connected to the ends of the arms and disposed laterally of the wheel mounting member.

11. In a vehicle having a frame, a steerable member journaled in the frame, a pair of vertically spaced levers fulcrumed on said member for oscillating movement in a vertical plane substantially parallel to the line of travel of the vehicle, a pair of laterally arranged transversely aligned ground wheels, and means connecting the wheels respectively to the opposite front and rear ends of the levers to support the same.

12. In a vehicle having a frame, a steerable member journaled in the frame, a pair of vertically spaced levers fulcrumed on said member for oscillating movement in a vertical plane substantially parallel to the line of travel of the vehicle, arms connected to corresponding front and rear ends of the levers and reversely turned to dispose their ends in closely spaced relation laterally of the steerable member, and ground wheels secured to the ends of the arms.

13. In a vehicle having a frame, a turnable member journaled in the frame, a pair of vertically spaced levers fulcrumed on the member and extended therefrom for vertical oscillating movement in a plane substantially parallel with the line of travel of the vehicle, links connecting the corresponding ends of the levers, arms rigidly extended from the links and reversely turned to dispose their ends in transverse alignment with the turnable member, and ground wheels secured to the ends of the said arms.

14. In a vehicle having a frame, a steering post journaled in the frame, a wheel mounting member detachably connected to a lower portion of the steering post for steering movement therewith, a pair of vertically spaced levers fulcrumed medially on the mounting member and extended therefrom at their ends for vertical swinging movement in a plane parallel with the line of travel of the vehicle, ground wheels, and means connecting the wheels to corresponding ends of the levers, the said wheels being located laterally at opposite sides of the mounting unit for steering manipulation thereby.

15. In a vehicle having a frame, a wheel mounting member secured to the frame, a pair of vertically spaced levers fulcrumed on the mounting member for vertical swinging movement at their ends in a plane parallel to the line of travel of the vehicle, link members connected to the corresponding ends of the levers, arms rigidly connected to the link members and reversely extended therefrom to terminate at their ends at opposite sides of the mounting member, ground wheels secured to the ends of the arms, and the said arms being inclined downwardly toward their wheel supported ends to thereby lower the wheels with respect to the vehicle frame.

16. In a vehicle, a narrow longitudinal frame member, an upstanding lug member secured to the upper side of the frame member, a pair of vertically spaced levers fulcrumed on horizontal transverse axes on the lug member for vertical swinging movement at their front and rear ends above the frame member, arms extending from corresponding front and rear ends of the levers alongside the lug member, wheels secured to the ends of the arms, and arranged at opposite sides of the lug member in closely spaced lateral arrangement, the said arms inclining downwardly toward their wheel supported ends to thereby lower the wheels with respect to the frame member.

ADOLPH RONNING.